(12) United States Patent
Tamura (10) Patent No.: US 8,172,414 B2
(45) Date of Patent: May 8, 2012

(54) INSTRUMENT ILLUMINATING DEVICE WITH LIGHT GUIDE BODY

(75) Inventor: Kinya Tamura, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 404 days.

(21) Appl. No.: 12/081,462

(22) Filed: Apr. 16, 2008

(65) Prior Publication Data

US 2008/0266832 A1 Oct. 30, 2008

(30) Foreign Application Priority Data

Apr. 24, 2007 (JP) ................................. 2007-113605

(51) Int. Cl.
*G01D 11/28* (2006.01)
(52) U.S. Cl. ............. 362/26; 362/30; 362/489; 362/511
(58) Field of Classification Search .................... 362/23, 362/26–30, 487, 489, 511, 555, 561; 116/287
See application file for complete search history.

(56) References Cited

U.S. PATENT DOCUMENTS

| 5,915,822 A * | 6/1999 | Ogura et al. ..................... 362/26 |
| 5,967,637 A | 10/1999 | Ishikawa et al. |
| 6,848,799 B2 * | 2/2005 | Kalantar ......................... 362/23 |
| 2007/0236909 A1 | 10/2007 | Tamura |

FOREIGN PATENT DOCUMENTS

| EP | 1 843 180 | 10/2007 |
| JP | 2003-130693 | 5/2003 |

OTHER PUBLICATIONS

European Search Report issued Aug. 21, 2008 European Application No. 08251440.7.

* cited by examiner

*Primary Examiner* — Jason Moon Han
(74) *Attorney, Agent, or Firm* — Wenderoth, Lind & Ponack, L.L.P.

(57) ABSTRACT

An illuminating device, for illuminating display designed parts on a display panel, includes at least one light source arranged at a rear side of the display panel, and a light guide body having a light guide portion for guiding the light toward its outer-circumferential portion to output the light toward the display designed parts through a front surface of the light guide portion. The outer-circumferential portion has an outer-circumferential side wall surface at is outer end. The light guide portion has at least one projecting portion projecting from the outer-circumferential side wall surface. The projecting portion is provided with a reflecting side surface formed along the outer-circumferential side wall surface so that the reflecting side surface can reflect the light traveling in the light guide portion to be outputted through the front surface of the light guide portion.

24 Claims, 6 Drawing Sheets

INSTRUMENT ILLUMINATING DEVICE WITH LIGHT GUIDE BODY

BACKGROUND OF THE INVENTION

1. Field of the Invention

The present invention relates to an instrument illuminating device that is capable of guiding light outputted from a light source toward an object or a portion to be irradiated. In particular, the invention is useful for lighting an instrument of a motor vehicle.

2. Description of the Related Art

A conventional illuminating device of this kind is disclosed in Japanese patent laid-open publication No. 2003-130693. This conventional lighting device is used, for example, to illuminate an indicator of a water temperature meter provided on an instrument panel of a motor vehicle, and it is equipped with a light source for emitting light, a light guide body for guiding the light toward an indicator needle, and an indicator plate having display designed portions, such as scale marks and characters, arranged around a center axis of the indicator needle. The light source is arranged in the vicinity of a spindle of the indicator needle, and the light guide body is arranged between the indicator plate and the light source to receive and guide its light. The light guide body is made of transparent plastic material such as polycarbonate (PC) and polymethylmethacrylate (PMMA), and is formed to have a sector form with a first partially-conic surface for reflecting the light introduced from the light source in an outer radial direction and a second partially-conic surface, which is arranged outwardly in a radial direction and provided with crimps and the like, for reflecting and guiding the light reflected on the first partially-conic surface toward the indicator needle and the display plate so as to illuminate them. The light guide body is arranged and supported between a scale board and a circuit substrate or a reflecting wall part, being associated at its rear surface with the reflecting wall part.

The above conventional illuminating device, however, encounters a problem in that the device cannot uniformly illuminate all parts to be irradiated of the display designed parts thereof, or of the designed parts and a background part in some cases.

In the above conventional illuminating device, the parts to be irradiated, such as the display designed parts or the display designed parts and the background part in some cases, cannot be uniformly illuminated because of the following reasons.

The light guide body is usually formed by using a molding process such as injection molding, where a molded light guide body is ejected from a mold by thrusting ejector pins to the light guide body. This will cause press flaws due to the press force of the ejector pins on a surface of the light guide body, so that these press flaws have optically deleterious effects on guidance, reflection and refraction of the light, consequently deteriorating the uniform illumination of all portions to be irradiated.

Although the above-described document does not disclose a support structure of the light guide body on the scale board, circuit substrate or the reflecting wall part, if pressed portions to be pressed by the ejector pins are provided to project radially outwardly from an outer circumferential portion of the light guide body so as to avoid the optical deleterious effects, guidance, reflection and refraction characteristics of the light at the pressed portions are changed. This also deteriorates the uniform illumination at and near the pressed portions.

It is, therefore, an object of the present invention to provide an illuminating device which overcomes the foregoing drawbacks and can enhance uniform illumination of a part to be irradiated of a light guide body which is integrally formed with a projecting portion which projects from a light guide portion, such as an ejector press portion to be pressed by an ejector pin when the light guide body is ejected from a mold in a forming process thereof, and a coupling portion for coupling with a coupling portion of a support member.

SUMMARY OF THE INVENTION

According to an aspect of the present invention, there is provided an instrument illuminating device that is capable of guiding light to illuminate display designed parts provided on a display plate of an instrument. The device includes at least one light source which is capable of emitting light and is arranged at a rear side of the display plate, and a light guide body having a light guide portion which is capable of guiding the light from the light source toward an outer-circumferential portion of the light guide body and is capable of outputting the light toward the display designed parts through a front surface of the light guide portion so that the parts can be illuminated. The outer-circumferential portion has an outer-circumferential side wall surface at an outer end of the light guide body which is at an opposite side of the light source and is capable of reflecting the light toward the front surface within the outer-circumferential portion. The light guide portion has at least one projecting portion which projects radially outwardly from part of the outer-circumferential side wall surface, and the projecting portion has a slotted hole, a slit, or a stepped portion having a reflecting inner side surface. The reflecting inner side surface is separated from an outer side of the projecting portion, and is located at a radially inner side of the projecting portion. The reflecting surface is also formed along the outer-circumferential side wall surface so that the reflecting side surface can reflect the light traveling in the light guide portion to be outputted through the front surface of the light guide portion.

Therefore, the instrument illuminating device of the present invention can enhance uniform illumination of a part needed to be irradiated of the light guide body which is integrally formed with the projecting portion which projects from the light guide portion.

Preferably, the projecting portion is an ejector press portion which is capable of being pressed when the light guide body which has been molded is ejected from a mold by using an ejector pin.

Therefore, press flaw remains on the ejector press portion, not on the light guide portion, because the ejector press portion is formed to project from the outer-circumferential side wall surface of the light guide portion and the ejector pin presses the ejector press portion of the light guide body in the forming process. This prevents the light guide portion from being optically damaged due to the press flow. Optical deleterious effects due to the addition of the ejector press portion can be substantially removed by the reflecting side surface provided on the ejector press portion.

Preferably, the projecting portion is a coupling portion which is capable of being coupled with a coupling portion of a supporting member.

Therefore, the light guide body can be supported by coupling its coupling portion with the coupling portion of the supporting member without optical deleterious effects due to formation of the coupling portion on the front surface and a rear surface of the light guide portion. On the other hand, optical deleterious effects due to the addition of the coupling portion on the outer-circumferential side wall surface can be substantially removed by the reflecting side surface provided on the coupling portion.

Preferably, the reflecting side surface is an inner side wall surface of one of a slotted hole, a slit, and a stepped portion formed on the projecting portion.

Therefore, the reflecting side surface can be easily formed as the inner side wall surface on the projecting portion, and the light guide body, including the inner side wall surface, the projecting portion and the light guide portion can be integrally molded.

Preferably, the light guide portion has a sector shape, where the light source is located at an inner side of the sector and the display designed parts are provided at an outer side of the sector, and an indicator needle is positioned at a center of the sector.

Therefore, the illuminating device can be used for the instrument device having the indicator needle and a partially circular display plate with the display designed parts arranged around the indicator needle. In this case, the device can uniformly illuminate the display designed parts.

Preferably, the illuminating device is used for illuminating the display designed parts on the display plate of an on-vehicle instrument device.

Therefore, the illuminating device can increase the utility of the instrument device of the motor vehicle.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Throughout the following detailed description, similar reference characters and numbers refer to similar elements in all figures of the drawings, and duplicate descriptions are omitted.

Figure 1:
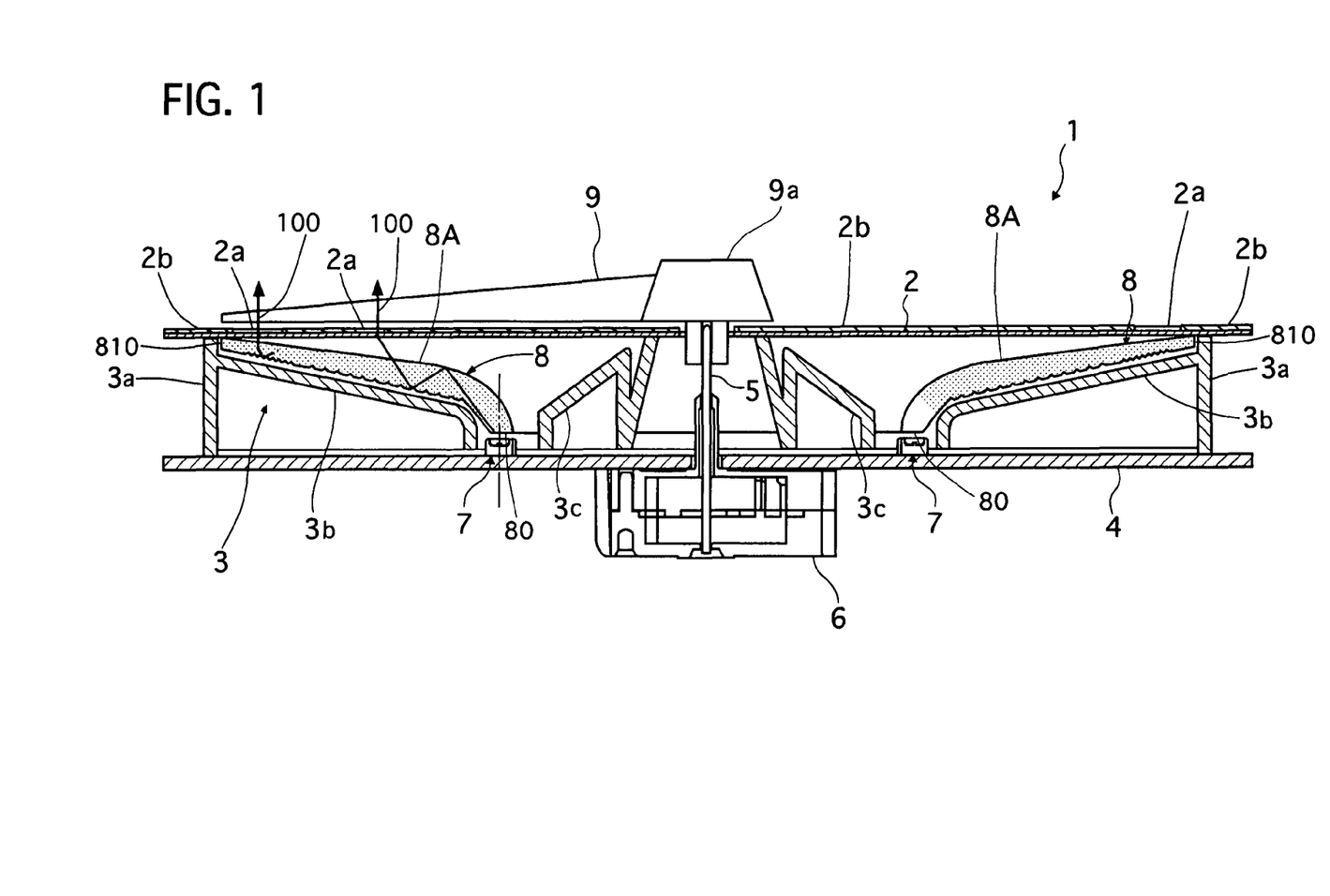
FIG. 1 is a cross-sectional side view showing an instrument, which is installed on an installment panel of a motor vehicle, with instrument illuminating device of a first embodiment according to the present invention.

Referring to FIG. 1 of the drawing, there is shown an instrument 1, installed on a not-shown instrument panel of a motor vehicle, having an instrument illuminating device of a preferred embodiment according to the present invention.

The instrument 1 is a speed meter, a tachometer (an engine speed meter), a fuel meter and the like. The instrument 1 has an indicator needle, display designed parts, including scale marks and characters, and a background, which are illuminated for enhancing visibility thereof. The instrument 1 includes a display panel 2 provided with display designed parts 2a and a background part 2b, a reflecting wall part 3, a base plate 4, the indicator needle 9, an indicator spindle 5, a spindle drive part 6, a plurality of light sources 7 and a light guide body 8.

The display panel 2 is made of transparent material or translucent material. This display panel 2 is attached to the instrument panel, and is provided with a hole through which the indicator spindle 5 can be inserted. The display designed parts 2a on the display panel 2 are arranged at appropriate positions, for example, along an inner side of an outer semi-circumference of the light guide body 8 (being at-least partially arranged around the indicator needle 5) and at other inner positions in this embodiment. The display designed parts 2a are used for displaying the characters, the scale marks, and they are transparent or translucent, while the background part 2b is opaque in this embodiment. The background part 2b may also be translucent, where in this case light can pass therethrough, so that the background part 2b is set to suppress brightness of the light. For example, in both cases, the background part 2b may be printed in dark color such as black, and the display designed parts 2a may be printed in other brighter colors such as an orange color.

The reflecting wall part 3 is formed to have an outer wall portion 3a at its outer side, a first conical wall portion 3b inside of the outer wall portion 3a, and a second conical wall portion 3c in the first conical wall portion 3b. The outer wall portion 3a is formed in a semicircular cylindrical shape. The first conical wall portion 3b is formed to extend from its inner base-plate side portion toward its outer display-panel side portion, and it is integrally connected with an inner surface of the outer wall portion 3a. The second conical wall portion 3c is formed to be integrally connected at its bottom portion with a bottom portion of the first conical wall portion 3b and to extend from its outer base-plate side portion toward its inner display-side portion. The second conical wall portion 3c is provided with a center hole for receiving the indicator spindle 5 therethrough, and with a plurality of holes for each receiving the light sources 7. This configuration enables the reflecting wall part 3 to be fixed on the base plate 4 by moving rearward and then fixing in a state where the light sources 7 and an output shaft, projecting through the base plate 4, of the spindle drive part 6 are attached on the base plate 4. The front surface of the reflecting wall part 3 is made so that the light 100 can be reflected on the front surface to travel toward a rear surface of the light guide body 8.

The base plate 4 is placed at a rear side of the display panel 2, located away from a rear surface thereof to be arranged in parallel thereto. The base plate 4 is provided thereon with the light sources 7, their not-shown drive circuit, the spindle drive part 6, and its not-shown electric circuit.

The indicator spindle 5 is coupled on its top portion with a cap portion 9*a* of an indicator needle 9 to be rotated by the spindle drive part 6. The needle 9 is placed over a front surface of the display panel 2 and extends radially outwardly from the cap portion 9*a* so as to indicate a vehicle speed or an engine speed, for example. The indicator needle 9 is made of transparent material or translucent material so as to pass and guide the light from the light sources 7 and cast it toward eyes of a user through an entire front surface thereof.

The spindle drive part 6 employs an electric motor.

The light sources 7 employ light emitting diodes (LEDs) in this embodiment, which is preferable because of lower manufacturing costs due to easy assembly and direct mount on the base plate 4, although they may use other sources of light. The light sources 7 are arranged around the indicator spindle 5, being evenly spaced apart from each other and also being located in the holes of the reflecting wall part 3. They cast the light forward (in an upper direction in FIG. 1) toward a light receiving flat surface 80 of the light guide body 8.

Figure 2:
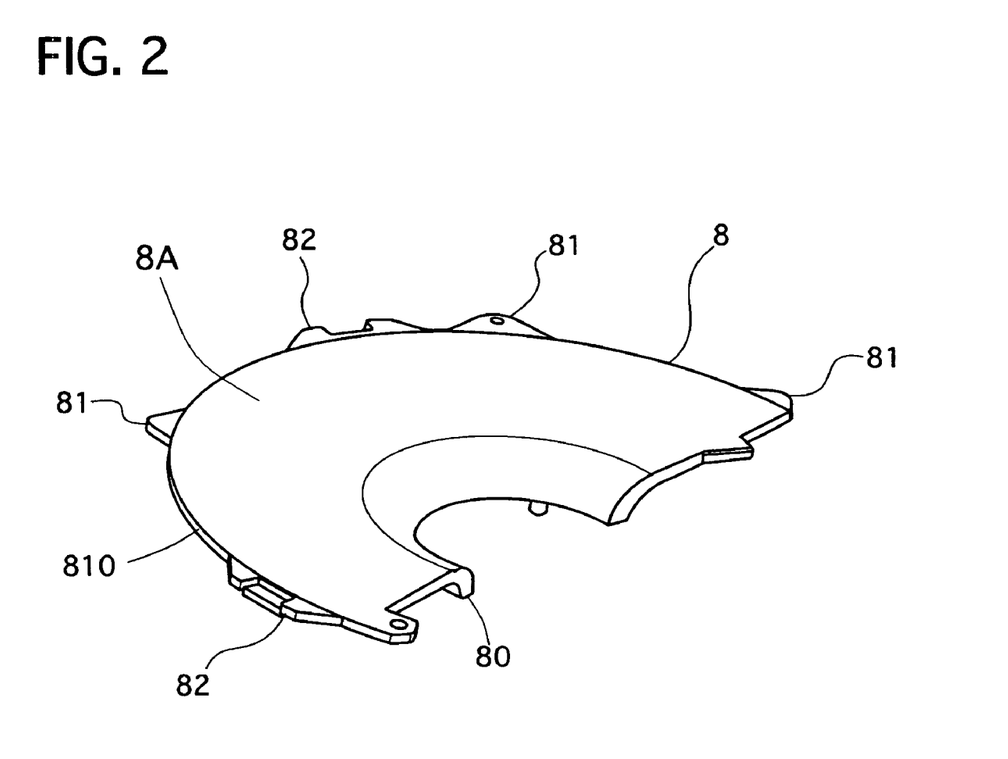
FIG. 2 is a perspective view showing a light guide body which is used in the instrument illuminating device of the first embodiment.
Figure 3:
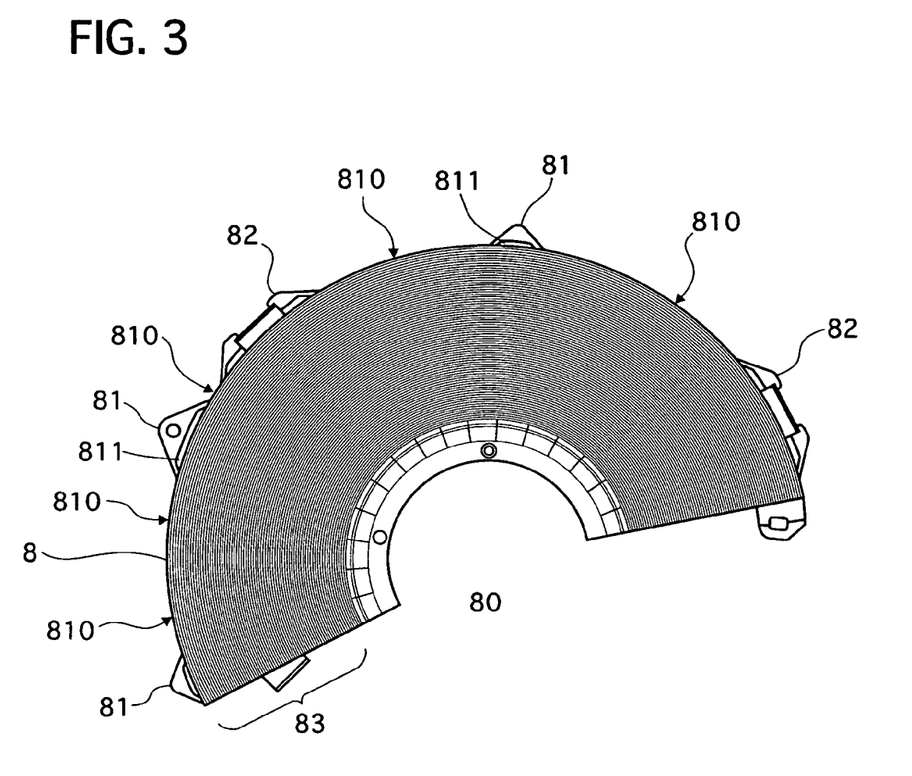
FIG. 3 is a rear view of the light guide body shown in FIG. 2.

The light guide body 8 is made of transparent material, and is formed like a sector shape centered on the spindle 5, having a semi-circumference, as shown in FIGS. 2 and 3. It includes a light guide portion 8A for guiding the light 100 emitted from the light sources 7 therethrough so as to output the light through a front surface of the light guide portion 8A to uniformly illuminate the display designed parts 2*a*, as shown in FIG. 1. An inner portion of the light guide body 8 is bent rearward to form the light receiving flat surface 80, which is set in parallel to the base plate 4. As shown in FIG. 3, on the flat surface 80, a hole and a pin portion are provided for positioning and connecting the light guide body 8 and the base plate to each other by using a not-shown hole and a pin provided on the base plate 4.

The light guide portion 8A is continuously connected with the inner portion thereof, being formed to extend obliquely and outward-radially toward the display panel 2. The thickness of the light guide portion 8A is set to become thinner in an outwardly radial direction. A rear surface of the light guide portion 8A is formed to have a reflecting portion 83, as shown in FIG. 3, consisting of a plurality of crimps in semi-circumferential shapes which are centered on the spindle 5. The crimps are formed to have semicircular shapes with the same center, and the number of crimps is appropriately determined. The reflecting portion 83 reflects the light 100 so that the light 100 can move forward and reach the display designed parts 2*a* to be uniformly irradiated.

Figure 4:
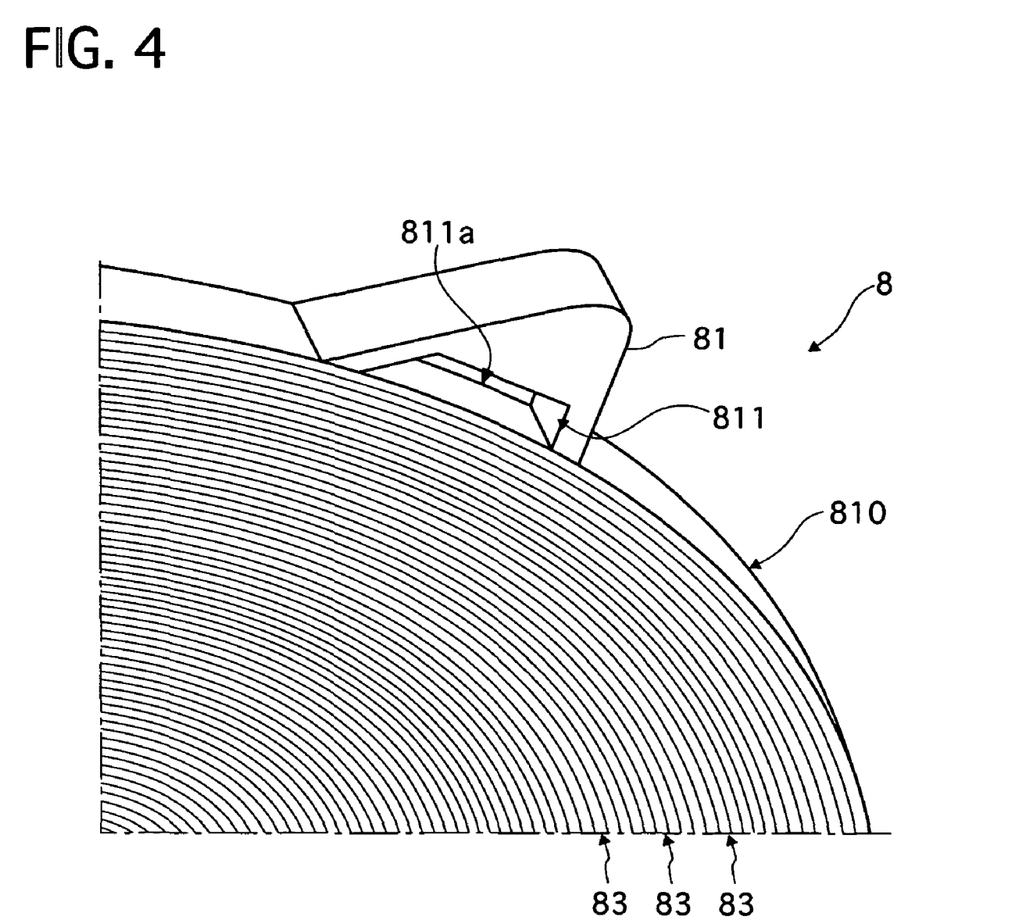
FIG. 4 is an enlarged and fragmentary rear perspective view showing the light guide body, shown in FIGS. 2 and 3, having on a circumferential portion thereof an ejector press portion which is pressed by an ejector pin so as to be ejected from a mold after the light guide body is molded in a forming process thereof.

As shown in FIGS. 2 to 4, on the outer circumferential portion of the light guide portion 8A, three ejector press portions 81 are also integrally formed to project from the outer circumferential portion, and are spaced from each other therealong. They are used for ejecting the light guide body from a not-shown mold by using three not-shown ejector pins after the light guide body 8 is molded in a forming process thereof. Each of the ejector press portions 81 corresponds to a projecting portion of the present invention.

The ejector press portions 81 are formed with a slotted hole 811 at its rear side and along the outer circumferential portion. Specifically, inner side wall surfaces 811*a* of the ejector press portions 81 are formed along an outer-circumferential side surface 810 of the light guide portion 8A. In other words, they have the same radius as that of the outer-circumferential side wall surface 810 provided at an outer end of the outer circumferential portion of the light guide body 8. Consequently, the inner side wall surfaces 811*a* function as the outer-circumferential side wall surface 810 in the ejector press portions 81, which provide similar optical effects therebetween. Incidentally, each of the inner side wall surfaces 811*a* corresponds to a reflecting side surface of the present invention.

The slotted holes 811 may be replaced by slits having inner side wall portions with the same radius as that of the outer-circumferential side wall surface 810. The slotted holes 811 and each of the slits corresponds to a cut-in portion of the present invention.

Figure 5:
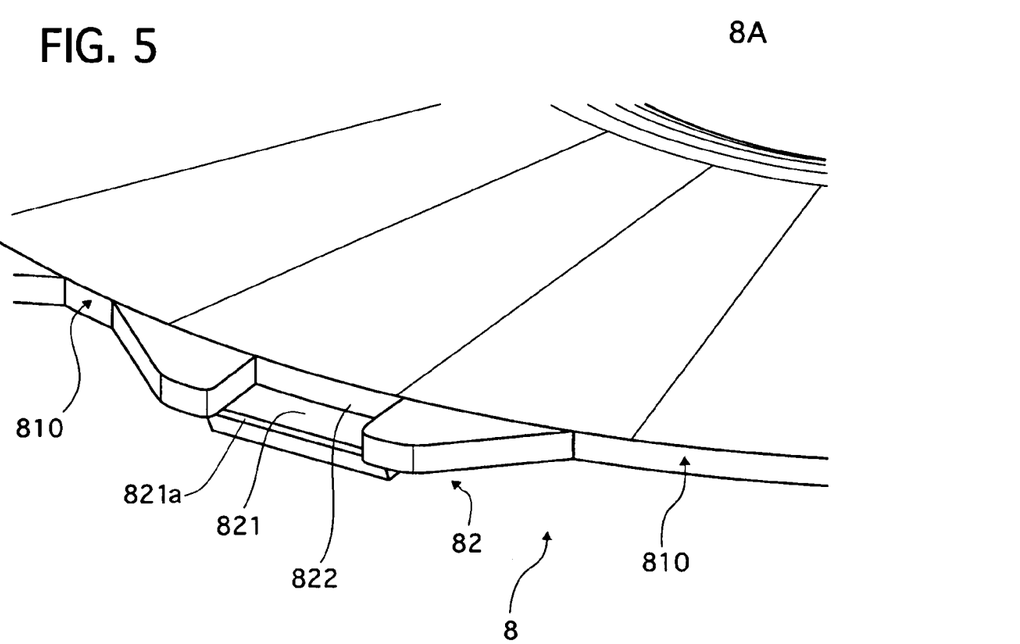
FIG. 5 is an enlarged and fragmentary front perspective view showing the light guide body with the ejector press portion.

As shown FIGS. 2, 3 and 5, on the outer circumferential portion of the light guide portion 8A, two coupling portions 82 are also integrally formed to project from the outer circumferential portion so that they are capable of coupling with three not-shown coupling portions integrally formed on the inner surface of the reflecting wall part 3, and thereby function as a supporting member of the present invention. The coupling portions of the reflecting wall part 3 are formed as claws and the coupling portions 82 of the light guide body 8 are formed as hooks so that they can be coupled with each other when the light guide body 8 is placed, at its proper position by using pin portions and holes formed thereon, in the reflecting wall part 3. The coupling portions of the light guide body 8 and the reflecting wall part 3 are capable of being bent because of their elasticity so as to be easily coupled with each other.

Specifically, as shown in FIG. 5, each of the coupling portions 82 are formed with a stepped portion having an inner side wall surface 822 formed along the outer-circumferential side wall surface 810 of the light guide portion 8A. In other words, the inner side wall surface 822 has the same radius as that of the outer-circumferential side wall surface 810 of the outer circumferential portion of the light guide body 8. Consequently, the inner side wall surfaces 822 function as the outer-circumferential side wall surface 810 in the coupling portions 82, which provides similar optical effects therebetween. Incidentally, each of the inner side wall surfaces 822 corresponds to a reflecting side surface of the present invention.

A coupling front surface 821 is formed rearward from a rear edge of the inner side wall surface 822, projecting outradially therefrom. The coupling front surface 821 has a tapered (beveled) surface 821*a* functioning as a part of the hook. Incidentally, the stepped portion of the coupling portions 82 corresponds to the cut-in portion of the present invention.

The indicator needle 9 is configured to emit light from its front surface, because its front surface has a fluorescent coating, the top portion thereof has a light source, or a light source is provided on the base plate 4, although their construction is omitted in FIG. 1.

The instrument 1 with the illuminating device of the embodiment is assembled as follows.

The spindle drive part 6 is attached on the rear surface of the base plate 4, its indicator spindle 5 passing through the base plate 6, and the light sources 7 and their drive circuit are installed on the front surface of base plate 4 around the spindle 5.

Then, the reflecting wall part 3 is brought rearward from a front side of the base plate 4 and is attached on the front surface of the base plate 4, surrounding the indicator spindle 5 and the light sources 7 to be exposed frontward. In this state, the light guide body 8 is brought into the reflecting wall part 3, and they are coupled with each other by their coupling portions, being positioned relative to the reflecting wall part 4 by using the pin portions and the holes.

Subsequently, the display panel 2 is placed on the reflecting wall part 3. Then, the cap portion 9a of the indicator 9 is fit on a top portion of the indicator spindle 5.

The operation of the instrument 1 with the illuminating device of the embodiment will be described.

As shown in FIG. 1, the light 100 is emitted frontward from the light sources 7 to hit the light receiving surface 80. The light 100 enters an interior of the light body 8, and it travels therein and is reflected on the front surface and the rear surface of the light guide portion 8A. Some of the light 100 passes toward the display plate 2 through the front surface of the light guide portion 8A, and the rest of the light 100 travels radially outward in the light guide portion 8A. This passing-through and reflection of the light 100 in the light guide portion 8A generates substantially uniformly all over the front surface of the light guide portion 8A, although only two light paths which pass through the front surface of the light guide portion 8A are illustrated in FIG. 1 for an easy viewing.

Some of the light 100 travels to the outer circumferential portion of the light guide portion 8A after it is reflected on the front surface and/or between the front surface and the rear surface of the light guide portion 8A.

The light 100 in the outer circumferential portion varies its paths according to configurations thereof.

Figure 7:
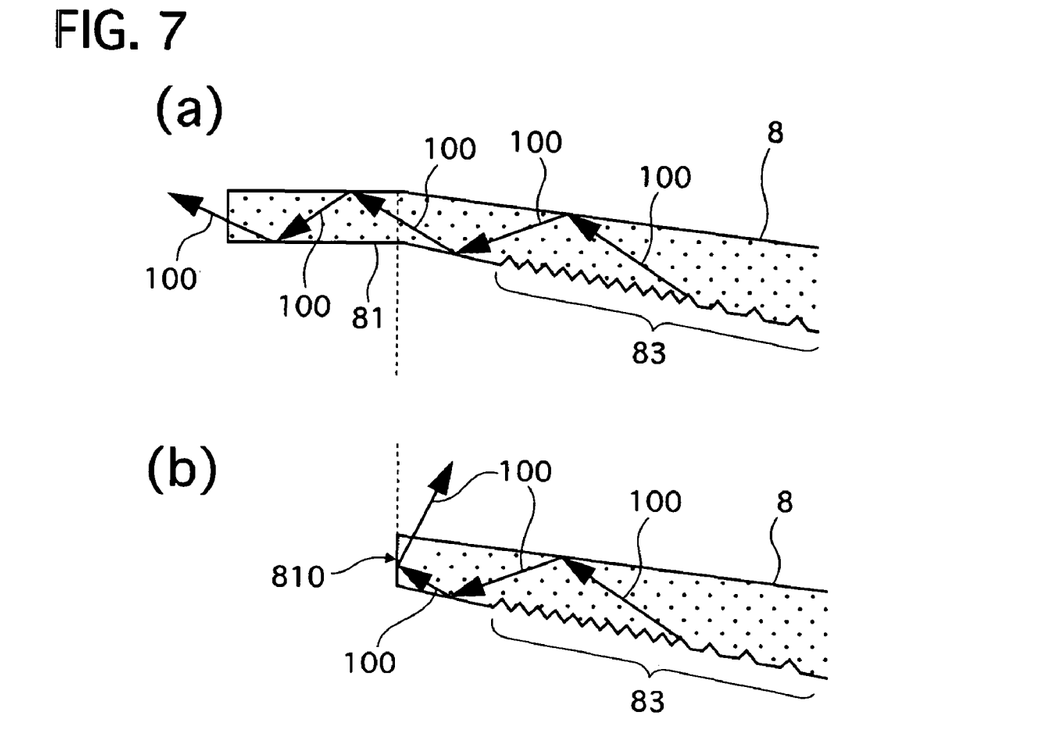
FIG. 7 is an enlarged cross-sectional side view showing comparative examples of paths of the light traveling through the light guide bodies, where (a) shows the light path at the ejector press portion with no slotted hole and (b) shows the light path at the outer circumferential portion with no ejector press portion.

When the light 100 travels to the outer-circumferential side wall surface 810, excluding those of the ejector press portions 81 and the coupling portions 82, of the light guide portion 8A, most of the light 100 is reflected on the outer-circumferential side wall surface 810 to pass frontward and inner-obliquely through the front surface thereof as shown in FIG. 7 (b). This passing light 100 may hit the display designed parts 2a so that a user can see it.

On the other hand, some of the light 100 travels to the ejector press portions 81 without the slotted holes of the embodiment as shown in FIG. 7 (a), the light travels beyond a position, which is indicated by a dotted line with reference to the outer-circumferential side wall surface 810 of FIG. 7 (b), having the same radius as that of the outer-circumferential side wall surface 810. In this case, the light 100 is not reflected here, traveling further outwardly in the radial direction. This reduces the light 100 for illumination of the outer-circumferential portion near root portions of the ejector corresponding portions 81, thereby deteriorating uniform illumination of the display designed parts 2a. In FIG. 7 (a), the light 100 is passing through an outer side wall surface of the ejector press portions 81, because the ejector press portions 81 are slightly angled with respect to the light guide portion 8A, so as to be parallel to the display plate 2 when they are assembled with each other. Some of the light 100 may be reflected on the outer side wall thereof according to an angle therebetween, but in this case, there is deterioration of the uniform illumination of the outer-circumferential portion near the root portions of the ejector press portions 81.

In addition, a similar problem occurs at portions of the outer-circumferential portion near root portions of the coupling portions 82.

Figure 6:
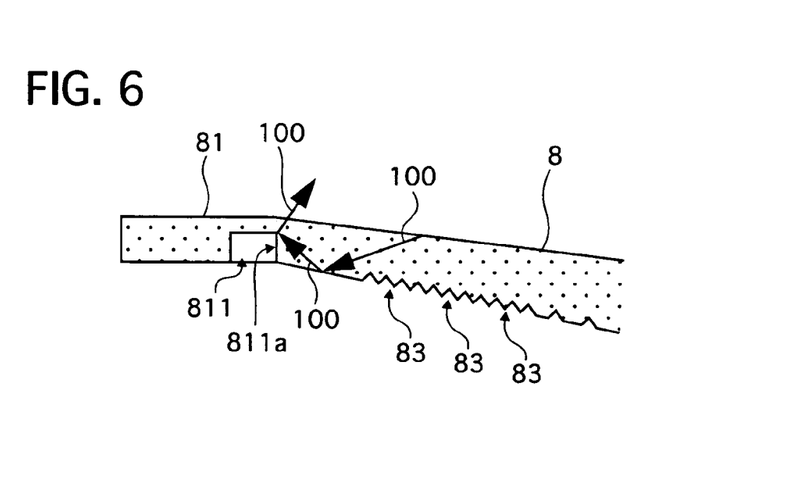
FIG. 6 is an enlarged cross-sectional side view showing the outer circumferential portion of the light guide body, the ejector press portion being formed with a slotted hole on a rear surface thereof and along an outer circumferential, having a path of traveling light guided by the light guide body being indicated.

However, in the embodiment, the ejector press portions 81 are provided with the slotted holes 811 forming the inner side wall surfaces 811a formed along the outer-circumferential side wall surface 810, and accordingly the optical effect changes here. When the light 100 travel toward the ejector press portions 81, it hits the inner side wall surfaces 811a on the ejector press portions 81. Most of the light 100 is reflected, as shown in FIG. 6, on the inner side wall surfaces 811a, which have the same radius of that of the outer-circumferential side wall surface 810, to travel frontward and inner-obliquely as well as in a state shown in FIG. 7 (b). This enhances uniform illumination of the display designed parts 2a on the outer-circumferential portion between the areas near and not-near the ejector press portions 81.

Figure 8:
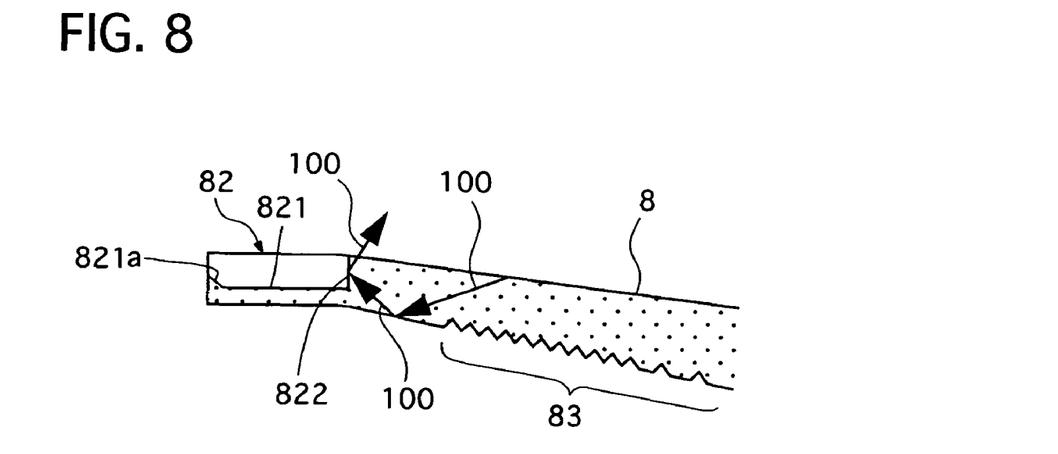
FIG. 8 is an enlarged cross-sectional side view showing an example of a path of the light, traveling through the light guide body, at a coupling portion which projects from the outer circumferential portion and is formed with a slotted hole along the outer circumferential, having a path of traveling light guided by the light guide body being indicated.

In addition, the coupling portions of the embodiment are configured to have the inner side wall surfaces 822 with the same radius as that of the outer-circumferential side wall surface 810 of the light guide portion 81. Therefore, most of the light 100 is reflected, as shown in FIG. 8, on the inner side wall surfaces 822 to travel frontward and inner-obliquely as well as in a state shown in FIG. 7 (b). This enhances uniform illumination of the display designed parts 2a on the outer-circumferential portion between the areas near and not-near the coupling portions 82.

Incidentally, the indicator needle 9 emits the light as described above. Therefore, the user can see the indicator needle 9 and the display designed parts 2a at the substantially same brightness, which enhances visibility thereof.

The illuminating device of the embodiment used for the instrument 1 has the following advantages.

The ejector press portions 81 are provided to project radially from parts of the outer circumference of the light guide portion 8A of the light guide body 8. When the light guide body 8 is molded by using an injection molding, for example, the ejector press portions 81 are pressed by ejector pins so that the molded light guide body 8 can be ejected from the mold. In this forming process, although press flaws remain on the ejector press portions 81, the light guide portion 8A of the light guide portion 8A can avoid the press flaws, which enables the light guide portion 8A to be free from the optical deleterious effects on guidance, reflection and refraction of the light passing therethrough and therein. Similar effects can be obtained by the coupling portions 82 which are project radially outward from the outer-circumferential portion of the light guide portion 8A.

In addition, the ejector press portions 81 and the coupling portions 82, which also project from the outer-circumferential portion of the light guide portion 8A, are provided with the slotted holes and the stepped portions, respectively. They have the inner side wall surfaces 811a and 822, which have the same radius as that of the outer-circumferential portion of the light guide portion 8A, which can avoid another optical problem due to addition of the ejector press portions 81 and the coupling portions 82. That is, the inner side wall surfaces 811a and 822 reflect most of the light frontward and inner-radially, so that they can enhance the uniform illumination of the display designed parts near the ejector press portions 81 and the coupling portions 82.

The illuminating device is used for the instrument 1 of a motor vehicle, where the instrument has the indicator needle 9, the display designed parts 2a arranged on the sector shape and surrounding the indicator needle 9 and the display panel 2 provided with the display designed parts 2a. Therefore, substantially uniform illumination of the display designed part 2a can be obtained, thereby improving the visibility and display quality of the instrument 1.

While the invention has been particularly shown and described with reference to preferred embodiments thereof, it will be understood that various modifications may be made therein. The invention is intended to cover in the appended claims all such modifications as fall within the true spirit and scope of the invention.

The illuminating device is used for the instrument panel of the motor vehicle in this embodiment, and may be used for other devices which need substantially uniform illumination.

The display designed parts 2a may be arranged to entirely surround the center axis 5a of the indicator spindle 5.

The slotted holes 811 and the stepped portions may be provided on one surface opposite to the surface of the embodiment. They may also be replaced by slots as long as their inner side wall surfaces are set along the outer-circumferential portion of the light guide portion 8A.

The background part 2b on the display panel 2 may be set so that it can pass the light. The display designed parts 2a and the background part 2b can be designed appropriately.

The projecting portions may be used for portions different from the ejector press portions and the coupling portions as long as they are not needed to be irradiated.

Although the supporting member is the reflecting wall part 3 in the embodiment, it is not limited thereto, and it may be another member.

The configuration of the outer-circumferential portion of the light guide portion 8A of the light guide body 8 is preferable, but it is not limited to a part or an entire side wall surface of a circular cylinder and it can be set appropriately.

The entire contents of Japanese Patent Application No. 2007-113605 filed Apr. 24, 2007 are incorporated herein by reference.

What is claimed is:

1. An instrument illuminating device for illuminating display designed parts on a display panel of an instrument, said instrument illuminating device comprising:
    a light source for emitting light, said light source to be arranged at a rear side of the display panel; and
    a light guide body having a light receiving surface for receiving the light from said light source, an outer circumferential portion, and a light guide portion configured to guide the light from said light source toward said outer circumferential portion of said light guide body, said light guide body being configured to output the light toward the display designed parts through a front surface of said light guide portion so as to illuminate the display designed parts, said outer circumferential portion having an outer circumferential side wall surface at an outer circumference of said light guide body, said outer circumferential side wall surface being located at a side of said light guide body opposite a side at which said light source is located, said outer circumferential side wall surface being reflective so as to reflect the light toward a front surface of said outer circumferential portion;
    wherein said light guide body has a projecting portion projecting radially outwardly from a part of said outer circumferential side wall surface, said projecting portion having one of a slotted hole, a slit, or a stepped portion with a reflective inner side wall forming a reflective inner side surface of said projecting portion, said reflective inner side surface being separated from an outer side of said projecting portion and being located at a radially-inner side of said projecting portion, said reflective inner side surface also being formed along a remaining part of said outer circumferential side wall surface so that said reflective side surface reflects the light traveling through said light guide portion so that the light is output through said front surface of said light guide portion to thereby prevent the light from reaching said outer side of said projecting portion through said reflective side surface.

2. The instrument illuminating device of claim 1, wherein said projecting portion comprises an ejector press portion for receiving an ejector pin configured to eject said light guide body from a mold.

3. The instrument illuminating device of claim 2, wherein said reflective inner side surface is formed on said ejector press portion.

4. The instrument illuminating device of claim 3, wherein said light guide portion has a sector shape, said light source being located at an inner side of said sector shape and the display designed parts are provided at an outer side of said sector shape, and an indicator needle of the instrument is to be positioned at a center of said sector shape.

5. The instrument illuminating device of claim 1, wherein said projecting portion comprises a coupling portion for coupling said light guide body to a supporting member.

6. The instrument illuminating device of claim 5, wherein said reflective inner side surface is formed on said coupling portion.

7. The instrument illuminating device of claim 6, wherein said light guide portion has a sector shape, said light source being located at an inner side of said sector shape and the display designed parts are provided at an outer side of said sector shape, and an indicator needle of the instrument is to be positioned at a center of said sector shape.

8. The instrument illuminating device of claim 1, wherein said reflective inner side surface is formed on said projecting portion.

9. The instrument illuminating device of claim 8, wherein said light guide portion has a sector shape, said light source being located at an inner side of said sector shape and the display designed parts are provided at an outer side of said sector shape, and an indicator needle of the instrument is to be positioned at a center of said sector shape.

10. The instrument illuminating device of claim 1, wherein said light guide portion has a sector shape, said light source being located at an inner side of said sector shape and the display designed parts are provided at an outer side of said sector shape, and an indicator needle of the instrument is to be positioned at a center of said sector shape.

11. The instrument illuminating device of claim 1, wherein said outer circumferential side wall surface of said outer circumferential portion and said reflective inner side surface of said projecting portion have a common center and the same radius.

12. The instrument illuminating device of claim 1, wherein said projecting portion has one of a slotted hole or a slit with said reflective inner side wall forming said reflective inner side surface of said projecting portion.

13. An instrument comprising:
    a display panel for a vehicle;
    display designed parts on said display panel; and
    an instrument illuminating device for illuminating said display designed parts on said display panel, said instrument illuminating device comprising:
        a light source for emitting light, said light source being arranged at a rear side of said display panel; and
        a light guide body having a light receiving surface for receiving the light from said light source, an outer circumferential portion, and a light guide portion configured to guide the light from said light source toward said outer circumferential portion of said light guide body, said light guide body being configured to output the light toward said display designed parts through a front surface of said light guide portion so as to illuminate said display designed parts, said outer circumferential portion having an outer circumferential side wall surface at an outer circumference of said light guide body, said outer circumferential side wall surface being located at a side of said light guide body opposite a side at which said light source is located, said outer circumferential side wall surface being reflective so as to reflect the light toward a front surface of said outer circumferential portion;

wherein said light guide body has a projecting portion projecting radially outwardly from a part of said outer circumferential side wall surface, said projecting portion having one of a slotted hole, a slit, or a stepped portion with a reflective inner side wall forming a reflective inner side surface of said projecting portion, said reflective inner side surface being separated from an outer side of said projecting portion and being located at a radially inner side of said projecting portion, said reflective inner side surface also being formed along a remaining part of said outer circumferential side wall surface so that said reflective side surface reflects the light traveling through said light guide portion so that the light is output through said front surface of said light guide portion to thereby prevent the light from reaching said outer side of said projecting portion through said reflective side surface.

14. The instrument of claim 13, wherein said projecting portion comprises an ejector press portion for receiving an ejector pin configured to eject said light guide body from a mold.

15. The instrument of claim 14, wherein said reflective inner side surface is formed on said ejector press portion.

16. The instrument of claim 15, wherein said light guide portion has a sector shape, said light source being located at an inner side of said sector shape and the display designed parts are provided at an outer side of said sector shape, and an indicator needle of the instrument is to be positioned at a center of said sector shape.

17. The instrument of claim 13, wherein said projecting portion comprises a coupling portion for coupling said light guide body to a supporting member.

18. The instrument of claim 17, wherein said reflective inner side surface is formed on said coupling portion.

19. The instrument of claim 18, wherein said light guide portion has a sector shape, said light source being located at an inner side of said sector shape and the display designed parts are provided at an outer side of said sector shape, and an indicator needle of the instrument is to be positioned at a center of said sector shape.

20. The instrument of claim 13, wherein said reflective inner side surface is formed on said projecting portion.

21. The instrument of claim 20, wherein said light guide portion has a sector shape, said light source being located at an inner side of said sector shape and the display designed parts are provided at an outer side of said sector shape, and an indicator needle of the instrument is to be positioned at a center of said sector shape.

22. The instrument of claim 13, wherein said light guide portion has a sector shape, said light source being located at an inner side of said sector shape and the display designed parts are provided at an outer side of said sector shape, and an indicator needle of the instrument is to be positioned at a center of said sector shape.

23. The instrument of claim 13, wherein said outer circumferential side wall surface of said outer circumferential portion and said reflective inner side surface of said projecting portion have a common center and the same radius.

24. The instrument of claim 13, wherein said projecting portion has one of a slotted hole or a slit with said reflective inner side wall forming said reflective inner side surface of said projecting portion.

* * * * *